United States Patent
Kida et al.

(10) Patent No.: US 12,318,968 B2
(45) Date of Patent: Jun. 3, 2025

(54) APPARATUS FOR TAKING OUT MOLDED PRODUCT USING VACUUM SUCKER WITH CONTROLLER THAT DETERMINES SUCKING OPERATION START TIME BASED ON A STABLE TIME INTERVAL

(71) Applicant: Yushin Precision Equipment Co., Ltd., Kyoto (JP)

(72) Inventors: Hiroki Kida, Kyoto (JP); Koji Ikeda, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 488 days.

(21) Appl. No.: 17/844,281

(22) Filed: Jun. 20, 2022

(65) Prior Publication Data
US 2022/0402172 A1    Dec. 22, 2022

(30) Foreign Application Priority Data

Jun. 22, 2021  (JP) .................................. 2021-103343
Jun. 16, 2022  (JP) .................................. 2022-097300

(51) Int. Cl.
*B29C 45/42*  (2006.01)
*B29C 33/44*  (2006.01)
(Continued)

(52) U.S. Cl.
CPC ............ *B29C 33/46* (2013.01); *B29C 33/442* (2013.01); *B29C 37/0003* (2013.01); *B25J 15/0616* (2013.01); *B29C 45/42* (2013.01)

(58) Field of Classification Search
CPC ... B29C 33/46; B29C 33/442; B29C 37/0003; B29C 45/42; B29C 2045/7633;
(Continued)

(56) References Cited

U.S. PATENT DOCUMENTS 5,256,364 A * 10/1993 Herbst .................... B29C 45/40
                                                             425/444
5,961,168 A * 10/1999 Kanno ............... H05K 13/0409
                                                             294/185
(Continued)

FOREIGN PATENT DOCUMENTS

EP         1 053 853 A1    11/2000
JP         2001-145946      5/2001
(Continued)

OTHER PUBLICATIONS

English translation of JP-4046179-B2, Takia, E, Feb. 2008 (Year: 2008).*

(Continued)

*Primary Examiner* — Kamini S Shah
*Assistant Examiner* — Jonathan Michael Skrzycki
(74) *Attorney, Agent, or Firm* — Rankin, Hill & Clark LLP

(57) ABSTRACT

A system for taking out a molded product that does not require an operator to determine the sucking operation start time for a vacuum sucker by himself/herself by trial and error is provided. A controller includes a time interval measuring section configured to measure a time interval judging from an output from a pressure detector. The time interval measuring section measures a stable time interval since the pressure in a pipe reaches a predetermined pressure until a sucking operation start pressure is detected judging from an output from the pressure detector. The sucking operation start pressure indicates that a suction nozzle starts operation to suck up a molded product hereby the predetermined pressure is maintained. A sucking operation start time determining section of the controller determines a sucking operation start time such that a stable time interval is longer (Continued)

than a bias time interval, concurrently with movement control for a moving mechanism.

6 Claims, 9 Drawing Sheets

(51) Int. Cl.
*B29C 33/46* (2006.01)
*B29C 37/00* (2006.01)
*B25J 15/06* (2006.01)

(58) Field of Classification Search
CPC .......... B29C 2945/76006; B29C 2945/76317; B29C 2945/76421; B29C 2945/76551; B29C 2945/76795; B29C 2945/76899; B29C 2945/76936; B29C 45/7626; B29C 33/44; B25J 15/0616

See application file for complete search history.

(56) References Cited

U.S. PATENT DOCUMENTS

| 2002/0051833 A1* | 5/2002 | Shiozaki | B29C 45/7626 425/165 |
| 2015/0052990 A1* | 2/2015 | Dunkmann | F04F 5/52 414/800 |

FOREIGN PATENT DOCUMENTS

| JP | 2005-050858 A | | 2/2005 |
| JP | 2007319960 A | * | 12/2007 |
| JP | 4046179 B2 | * | 2/2008 |
| JP | 2010110863 A | * | 5/2010 |

OTHER PUBLICATIONS

English translation of JP-2007319960-A, Nakade, T, Dec. 2007 (Year: 2007).*
English translation of JP-2010110863-A, Ito, S, May 2010 (Year: 2010).*
European Search Report dated Dec. 28, 2022, 2 pages.

* cited by examiner

APPARATUS FOR TAKING OUT MOLDED PRODUCT USING VACUUM SUCKER WITH CONTROLLER THAT DETERMINES SUCKING OPERATION START TIME BASED ON A STABLE TIME INTERVAL

TECHNICAL FIELD

The present invention relates to a system for taking out a molded product capable of suppressing the occurrence of a suction error.

BACKGROUND ART

Japanese Patent Application Publication No. 2001-145946 (Patent Document 1) discloses a system for taking out a molded product operable to suck up a molded product using a vacuum sucker after opening a mold of a molding machine and take out the molded product, in which the operation time of a vacuum generator is shortened by grasping the time when the vacuum sucker reaches a vacuum in advance and starting the operation of the vacuum sucker at an optimum time.

[Patent Document 1] Japanese Patent Application Publication No. 2001-145946 (JPA 2001-145946)

SUMMARY OF INVENTION

Technical Problem

The related art described above does not take into consideration the fact that the suction time is not constant since the time when the projection of ejector pins for pushing out the molded product from the mold is completed is fluctuated among take-out cycles, or the fact that a pressure detector needs certain measurement time intervals to reliably detect a predetermined pressure. Therefore, in practice, it has been difficult for an operator to appropriately set the sucking operation start time for the vacuum sucker, and there has been a limit to preventing the occurrence of an error in sucking up the molded product.

An object of the present invention is to provide a system for taking out a molded product that does not require an operator to determine the sucking operation start time for a vacuum sucker by himself/herself by trial and error.

Another object of the present invention is to provide a system for taking out a molded product that enables a suction member to reliably take out a molded product even if the operation time of a vacuum generator is shortened.

Solution to Problem

The present invention provides a system including a vacuum sucker, a moving mechanism, and a controller. The vacuum sucker includes a suction member operable to suck up a molded product, a vacuum generator connected to the suction member via a pipe to apply a vacuum pressure to the suction member, a pressure valve provided in the pipe between the vacuum generator and the suction member to allow and block communication between the vacuum generator and the suction member, and a pressure detector operable to detect a pressure in the pipe between the pressure valve and the suction member. The moving mechanism is operable to move the suction member to transport the molded product to a release position after the molded product is pushed out of a mold of a molding machine by an ejector pin and sucked up by the suction member and then taken out. The controller is configured to execute operation control for the vacuum generator and the pressure valve, and movement control for the moving mechanism. The controller is configured to start operation of the suction member to suck up the molded product after the pressure in the pipe reaches a predetermined pressure before the suction member sucks up the molded product, concurrently with the movement control for the moving mechanism.

In the present invention, the controller includes a time interval measuring section configured to measure a time interval judging from an output from the pressure detector. The time interval measuring section is configured to measure a stable time interval since the pressure in the pipe reaches the predetermined pressure until a sucking operation start pressure (a pressure for starting a sucking operation) is detected judging from an output from the pressure detector. The sucking operation start pressure indicates that the suction member starts operation to suck up the molded product with the predetermined pressure being maintained. The controller determines a sucking operation start time (a time for starting a sucking operation) such that the stable time interval is longer than a bias time interval, concurrently with the movement control for the moving mechanism.

The bias time interval is a time interval that is necessary to detect that the pressure in the pipe has reached the predetermined pressure.

According to the present invention, the stable time interval is longer than the bias time interval, which is necessary to detect that the pressure in the pipe has reached the predetermined pressure. Thus, it is not necessary for an operator to determine the sucking operation start time (delay time), which allows the pressure detector to operate without trouble to prevent a suction error, by himself/herself by trial and error. According to the present invention, in addition, the controller determines a sucking operation start time, which allows the pressure detector to operate without trouble to prevent a suction error, even when the amount of air to be consumed by the vacuum sucker is reduced by delaying the sucking operation start time (by extending the delay time before the start of sucking operation). Thus, the amount of air to be consumed can be reduced, and the molded product can be stably taken out.

The controller may include a stable time interval determining section and a sucking operation start time determining section. The stable time interval determining section is configured to determine whether or not the stable time interval is longer than the bias time interval in a course during which the vacuum generator starts sucking operation by opening the pressure valve and the moving mechanism performs an operation to move the suction member closer to the molded product. The sucking operation start time determining section is configured to determine, as an allowable sucking operation start time (an allowable time for starting a sucking operation), the sucking operation start time at a time when the stable time interval determining section determines that the stable time interval T3 is longer than the bias time interval. When it is determined that the sucking operation start time is not an allowable sucking operation start time, an alarm may be issued through display on a screen of a control unit or sound. In this case, the operator may change parameters related to the sucking operation start time using the control unit so as to advance the sucking operation start time. Alternatively, the control unit may automatically advance the sucking operation start time. The operator does not have to do anything in particular when the sucking operation start time is an allowable sucking operation start time.

In order to shorten the operation time of the vacuum sucker, the controller may determine the sucking operation start time as follows.

Here, a time when the suction member passes an original sucking start position (an original position for staring a sucking operation) is defined as 0. In a first take-out cycle, the controller causes the vacuum generator to start sucking operation by opening the pressure valve at the original sucking start position determined in advance and causes the moving mechanism to perform an operation to move the suction member closer to the molded product. During this course of operation, the controller acquires from the time interval measuring section, as an initial stable time interval T3( [illegible] ), a time interval since a time when the pressure detector detects the predetermined pressure until a time when the pressure detector detects the sucking operation start pressure which indicates that the suction member has sucked up the molded product. In second and subsequent take-out cycles, when the time interval measuring section measures a delay time interval Δti from time 0, the controller causes the vacuum generator to start sucking operation by opening the pressure valve at the original sucking start position determined in advance and causes the moving mechanism to perform an operation to move the suction member closer to the molded product. Here, the delay time interval Δti is defined so as to become longer as the number of take-out cycles is increased on a basis of the initial stable time interval and a number of take-out cycles. During this course of operation, the controller acquires from the time interval measuring section the stable time interval T3(i) since the pressure detector detects the predetermined pressure until the pressure detector detects the sucking operation start pressure. The controller continues the second and subsequent take-out cycles while changing the delay time interval Δti stepwise, and determines the delay time interval Δti which renders the stable time interval longer than the bias time interval as an allowable delay time interval Δti'. Thereafter, the controller determines, as the allowable sucking operation start time, a time when the allowable delay time interval Δti' has elapsed since the time 0. In this manner, an appropriate sucking operation start time can be automatically determined even if the sucking operation start time is delayed stepwise.

In order to shorten the operation time of the vacuum sucker, the controller may also determine the sucking operation start time as follows.

Here, a time when the suction member passes the original sucking start position is defined as 0. In first to n-th take-out cycles where n is an integer of two or more, the controller causes the vacuum generator to start sucking operation by opening the pressure valve at the original sucking start position determined in advance and causes the moving mechanism to perform an operation to move the suction member closer to the molded product. During this course of operation, the controller acquires from the time interval measuring section, as an initial stable time interval, a time interval since a time when the pressure detector detects the predetermined pressure until a time when the pressure detector detects the sucking operation start pressure which indicates that the suction member has started operation to suck up the molded product. Then, the controller determines a minimum value or an average value for n initial stable time intervals T3(n) as an initial stable time interval to be used thereafter. Here again, a time when the suction member passes the original sucking start position P0 is defined as 0. In (n+1)-th and subsequent take-out cycles, the controller causes the vacuum generator to start sucking operation by opening the pressure valve and causes the moving mechanism to perform an operation to move the suction member closer to the molded product when the time interval measuring section measures a delay time interval Δti from time 0. Here, the delay time interval Δti is defined so as to become longer as the number of take-out cycles is increased on a basis of the initial stable time interval and a number of take-out cycles. During this course of operation, the controller acquires from the time interval measuring section, the stable time interval since the pressure detector detects the predetermined pressure until the pressure detector detects the sucking operation start pressure. Then, the controller continues the (n+1)-th and subsequent take-out cycles while changing the delay time interval Δti stepwise, and determines the delay time interval Δti which renders the stable time interval longer than the bias time interval Tb as an allowable delay time interval Δti'. Thereafter, the controller determines a time when the allowable delay time interval Δti' has elapsed since the time 0 as the allowable sucking operation start time. This enhances the precision in determining the stable time interval, and an appropriate sucking operation start time can be automatically determined even if the sucking operation start time is delayed stepwise.

DESCRIPTION OF EMBODIMENTS

Figure 1:
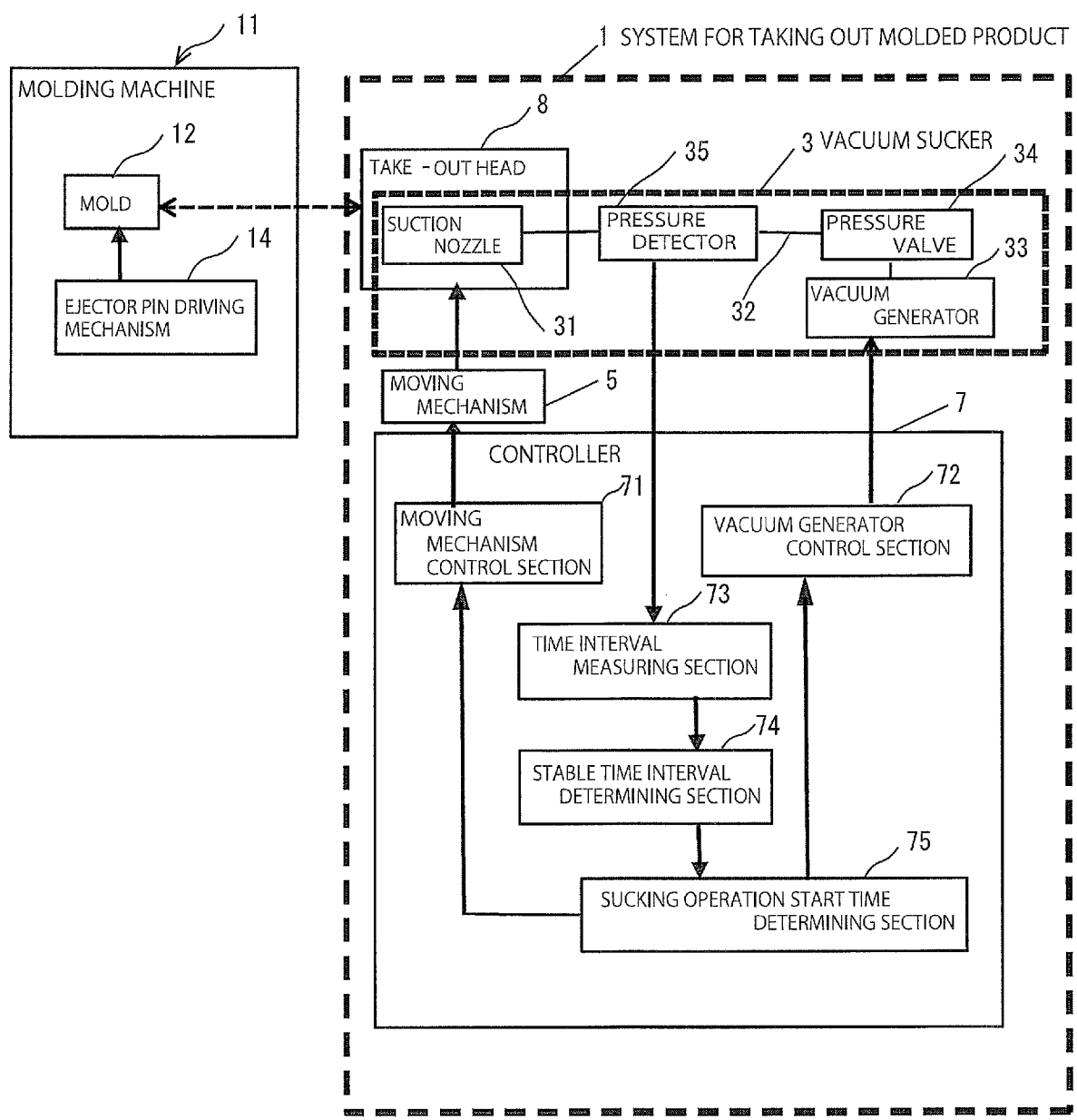
FIG. 1 is a block diagram illustrating the configuration of a main portion of a system for taking out a molded product according to an embodiment of the present invention.

A system for taking out a molded product according to an embodiment of the present invention will be described in detail below with reference to the drawings. FIG. 1 is a block diagram illustrating the configuration of a main portion of a system 1 for taking out a molded product according to the present embodiment of the present invention. The system is operable to take out a resin molded product from a resin molding machine 11. The system 1 includes a vacuum sucker 3, a moving mechanism 5, and a controller 7.

The vacuum sucker 3 includes a suction nozzle 31 that serves as a suction member operable to suck up a molded product, a vacuum generator 33 connected to the suction nozzle 31 via a pipe 32 to apply a vacuum pressure to the suction nozzle 31, a pressure valve 34 provided in the pipe 32 between the vacuum generator 33 and the suction nozzle 31 to allow and block communication between the vacuum generator 33 and the suction nozzle 31, and a pressure detector 35 operable to detect a pressure in the pipe 32 between the pressure valve 34 and the suction nozzle 31. The suction nozzle 31 is mounted on a take-out head 8 that is moved by the moving mechanism 5.

Figure 2:
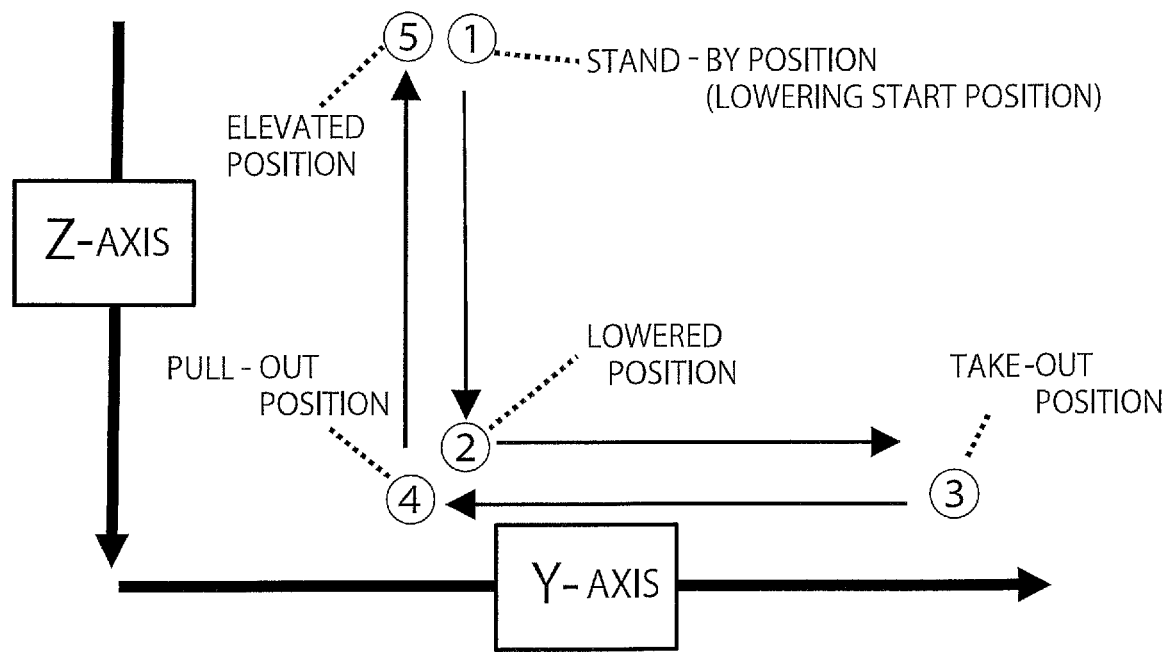
FIG. 2 illustrates a path of movement of a take-out head by a moving mechanism.
Figure 3:
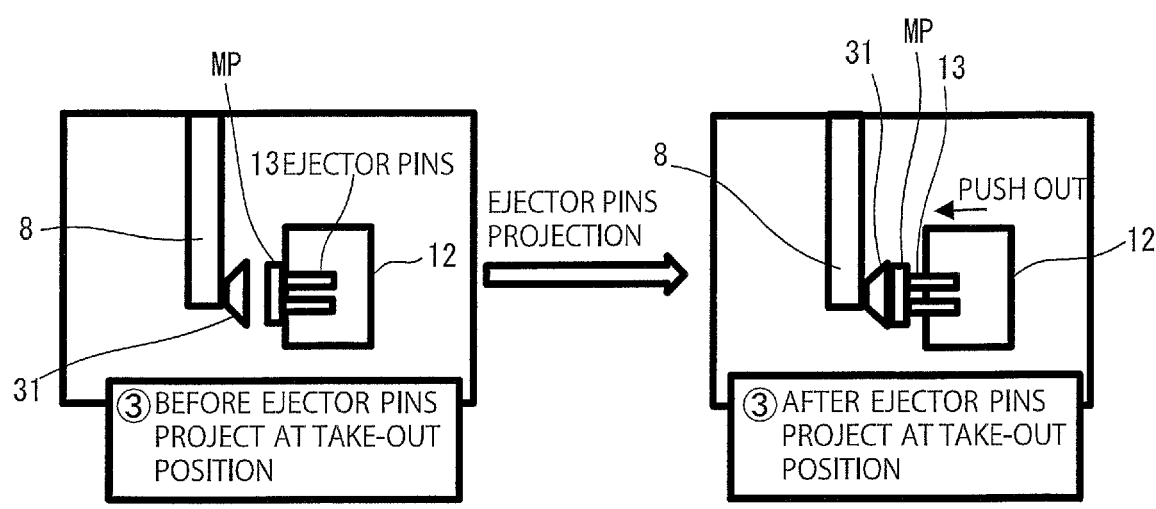
FIG. 3 illustrates push-out operation by ejector pins.

When the moving mechanism 5 is a well-known three-axis moving mechanism, that is, an XYZ moving mechanism, as illustrated in FIG. 2, the take-out head 8 provided with the suction nozzle 31 is moved along the Z-axis and the Y-axis in the order of a stand-by position (lowering start position), a lowered position, a take-out position, a pull-out position, and an elevated position to take out a molded product. Then, as illustrated in FIG. 3, a molded product MP is pushed out through projecting operation of ejector pins 13 and sucked up by the suction nozzle 31 to be taken out of a molding die 12 of the molding machine 11 with the moving mechanism 5 being located at the take-out position. After that, the moving mechanism 5 moves the take-out head 8, to which the suction nozzle 31 is mounted, from the elevated position to a release position (not illustrated). The molded product MP is released at the release position with suction by the suction nozzle 31 being canceled at the release position.

The controller 7 is configured to execute operation control for the vacuum generator 33 and the pressure valve 34 and movement control for the moving mechanism 5. In the present embodiment, as illustrated in FIG. 1, the controller 7 includes a moving mechanism control section 71 configured to control the moving mechanism 5, a vacuum generator control section 72 configured to control the vacuum generator 33, a time interval measuring section 73 configured to measure a time interval judging from an output from the pressure detector 35, a stable time interval determining section 74, and a sucking operation start time determining section 75. Each time a plurality of take-out cycles are executed, for example, in a course of adjustment during which the controller 7 causes the vacuum generator 33 to start sucking operation by opening the pressure valve 34 and causes the moving mechanism 5 to perform an operation to move the suction nozzle 31 closer to the molded product, the stable time interval determining section 74 determines a stable time interval T3 judging from an output from the time interval measuring section 73 which measures a time interval Ttr1 before the pressure detector 35 detects a predetermined pressure and a stable time interval T3 since the pressure detector 35 detects the predetermined pressure until a sucking operation start pressure is detected, whereby the sucking operation start pressure indicates that the suction nozzle 31 starts operation to suck up the molded product MP. The stable time interval determining section 74 determines whether or not the stable time interval T3 is longer than the bias time interval Tb in a course during which the vacuum generator 33 starts sucking operation by opening the pressure valve 34 and the moving mechanism 5 performs an operation to move the suction member 31 closer to the molded product MP. The sucking operation start time determining section 75 determines, as an allowable sucking operation start time, the sucking operation start time at a time when the stable time interval determining section 74 determines that the stable time interval T3 is longer than the bias time interval. When it is determined that the sucking operation start time is not an allowable sucking operation start time, an alarm may be issued through display on a screen of a controller unit or sound. In this case, the operator may change parameters related to the sucking operation start time using the control unit so as to advance the sucking operation start time. Alternatively, the control unit may automatically advance the sucking operation start time. The operator does not have to do anything in particular when the sucking operation start time is an allowable sucking operation start time.

Then, the sucking operation start time determining section 75 determines a sucking operation start time using a total time interval T1=Ttr1+T3.

Figure 7:
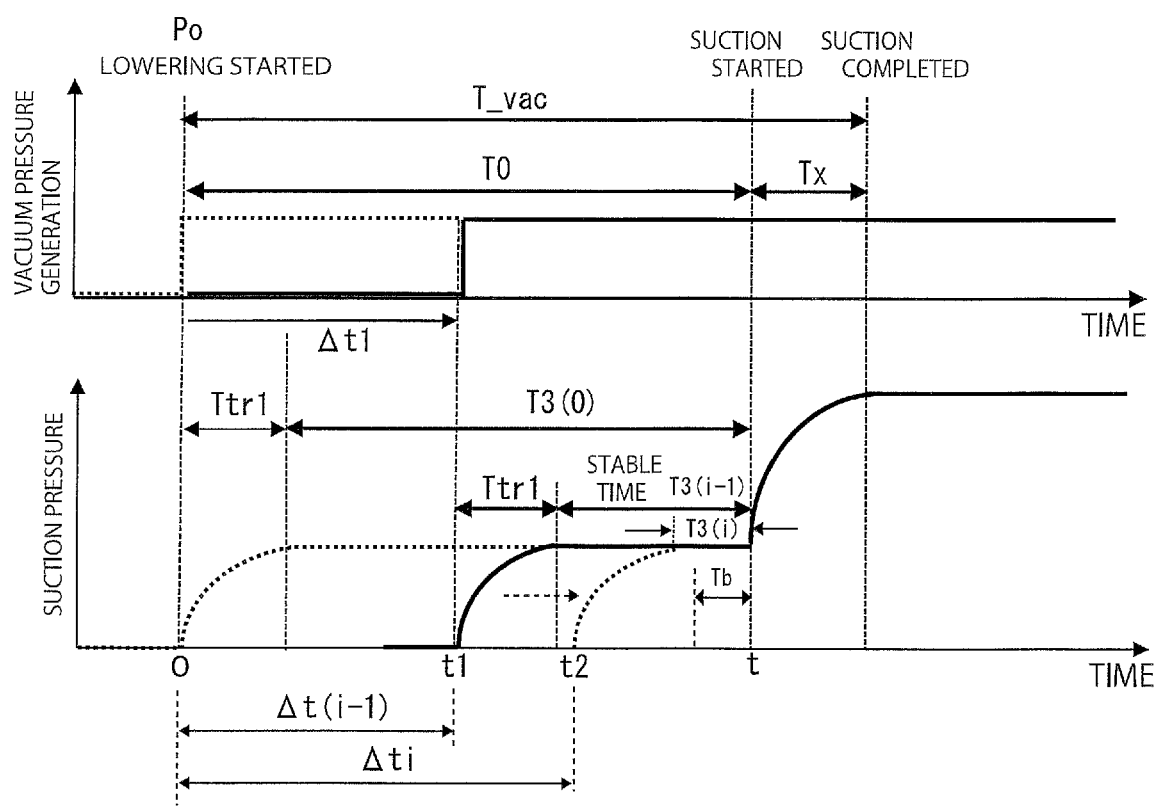
FIG. 7 illustrates the relationship between the time and the suction pressure for explaining drawing operation and sucking operation according to the embodiment for reducing the amount of air to be consumed.

In theory, as seen in FIG. 7 to be discussed later, the controller 7 operates as follows. Here, a time when the suction nozzle 31 passes the original sucking start position is defined as 0. The controller 7 causes the vacuum generator 33 to start sucking operation by opening the pressure valve 34 at an original sucking start position P0 as determined in advance, and causes the moving mechanism 5 to perform an operation to move the suction nozzle 31 closer to the molded product determined in advance and the moving mechanism 5 performing operation to move the suction nozzle 31 closer to the molded product. During this course of operation, the controller 7 acquires, as an initial stable time interval T0, a time interval since a time when the pressure detector 35 detects the predetermined pressure until a time when the pressure detector 35 detects the sucking operation start pressure which indicates that the suction nozzle 31 has sucked up the molded product MP.

A time interval obtained by subtracting the total time interval T1 from the initial stable time interval T0 is defined as a delay time interval $\Delta t$, and the sucking operation start time can be determined from the delay time interval $\Delta t$.

It is recognized that the predetermined pressure has been reached and a stable pressure has been reached, when a time interval (corresponding to a bias time interval Tb) for which the pressure in the pipe 32 falls in a small variation width ($\Delta p$) elapses, judging from an output from the pressure detector 35. The state in FIG. 4 means that the stable pressure continues for the stable time interval T3.

Figure 4:
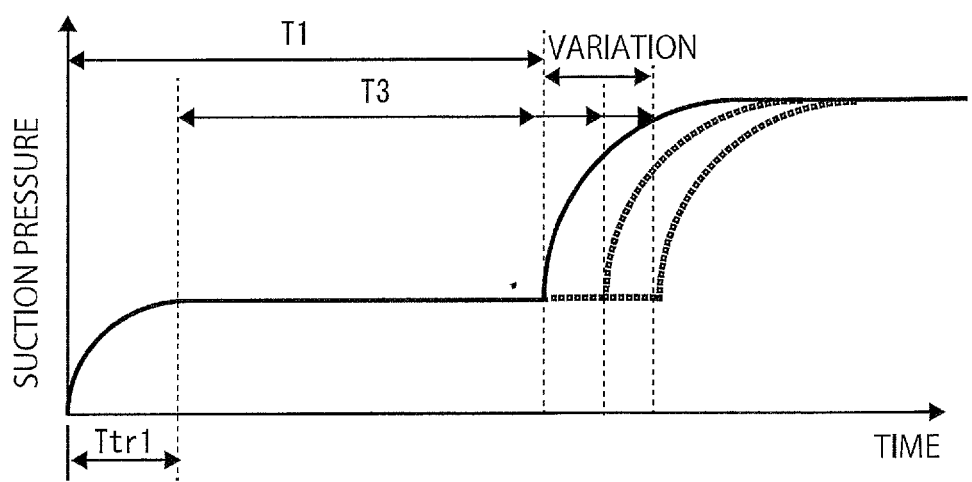
FIG. 4 illustrates the relationship between the time and the suction pressure for explaining drawing operation and sucking operation.

As illustrated in FIG. 4, the stable time interval T3 is varied among take-out cycles, since at least the operation time of the ejector pins 13 is fluctuated. Therefore, the total time interval T1=Ttr1+T3 is also varied. Since the output from the pressure detector 35 is slightly varied, it is determined that the stable pressure at which the sucking operation start pressure can be correctly detected has been reached only when the bias time interval Tb (during which the output from the pressure detector 35 is still slightly varied) elapses after the pressure in the pipe 32 has reached the predetermined pressure.

When the total time interval T1=Ttr1+T3 is shortened by delaying the sucking operation start time discussed earlier in order to reduce the amount of air to be consumed by the vacuum sucker 3, the vacuum sucker 3 may contact the molded product before the stable time interval is determined, or the suction stability may not be secured.

Thus, in the present embodiment, the sucking operation start time determining section 75 determines the sucking operation start time such that the stable time interval T3 is longer than the bias time interval Tb. Thus, there is no fear of the occurrence of a suction error when take-out operation is performed using the sucking operation start time determined by the sucking operation start time determining section 75.

This also allows the fluctuations in the operation of the ejector pins to be absorbed by the stable time interval T3.

Thus, it is possible to prevent the occurrence of a suction error due to the fluctuations in the operation of the ejector pins.

Figure 5:
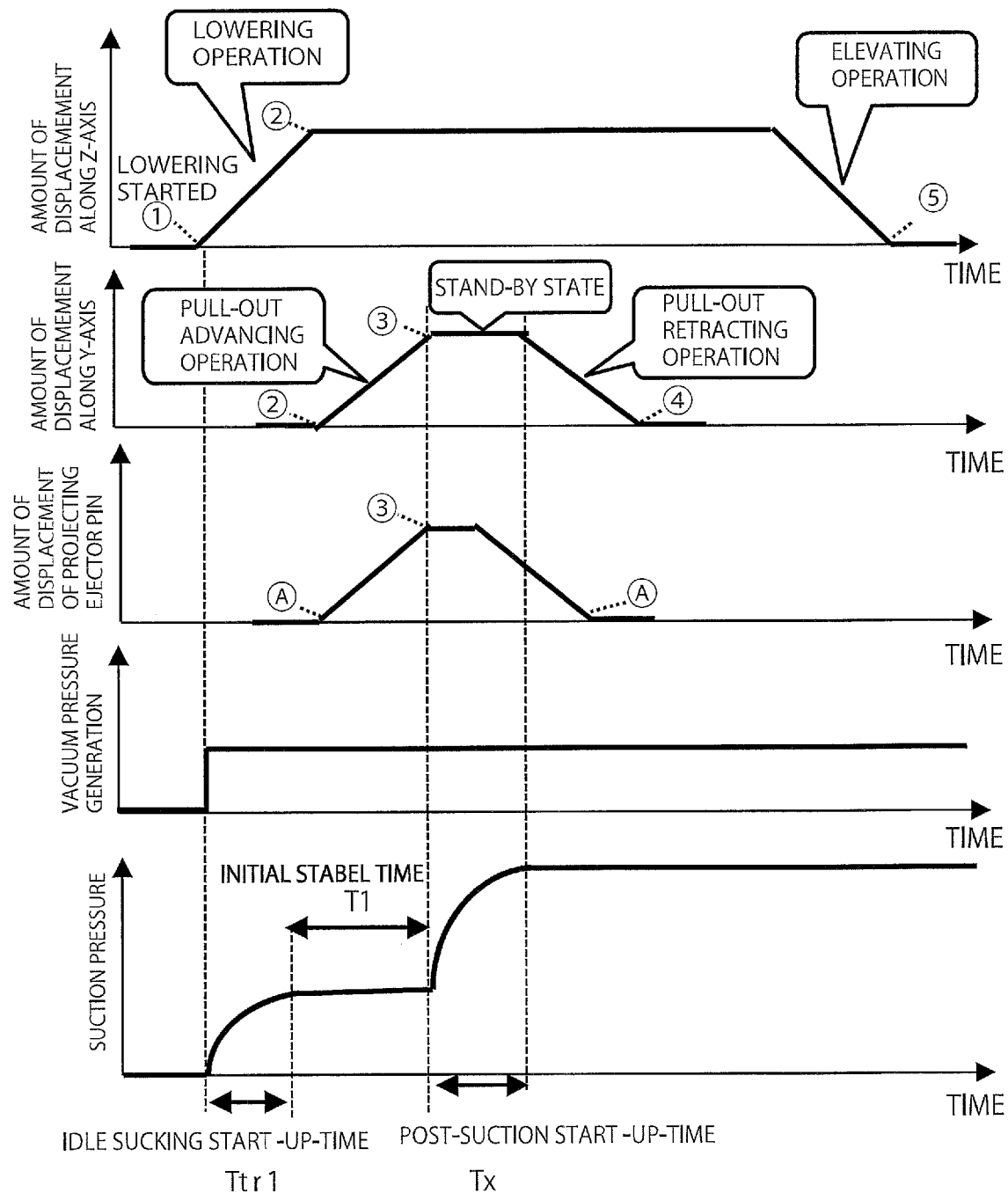
FIG. 5 illustrates the relationship between the time and the suction pressure for explaining drawing operation and sucking operation according to the embodiment.

There is no fear of the occurrence of a suction error when drawing operation is started in the early stage of moving the suction nozzle 31 (lowering start position of the suction nozzle) and sucking operation is started after a sufficiently stable suction pressure is achieved (after sufficiently securing the stable time interval T3 which is longer than the bias time interval Tb) as illustrated in FIG. 5. This, however, causes a problem that the electricity cost is increased, as the operation time of the vacuum generator 33 is unnecessarily extended (the amount of air to be consumed is increased).

Figure 6:
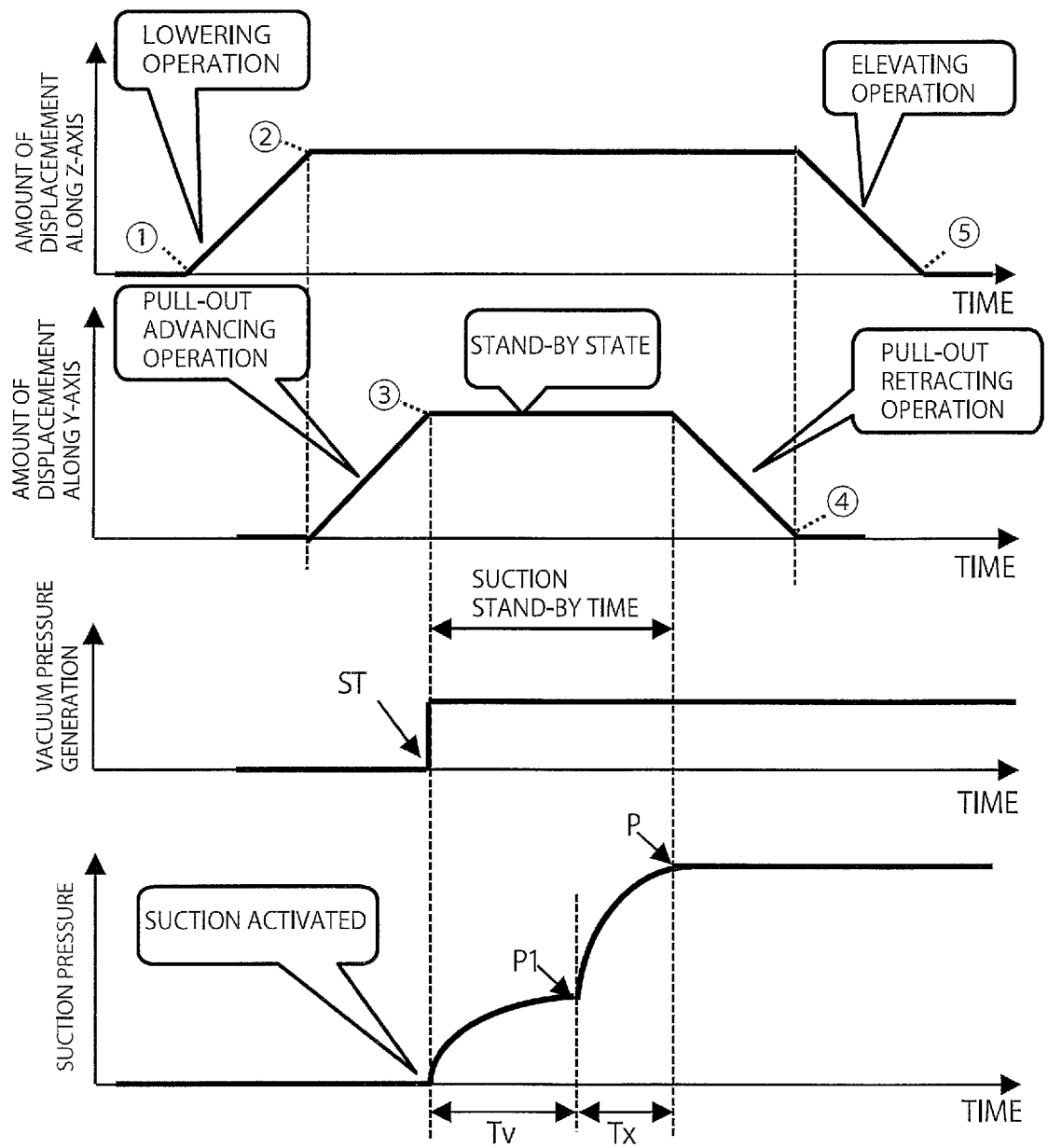
FIG. 6 illustrates the relationship between the time and the suction pressure for explaining drawing operation and sucking operation of a system for taking out a molded product according to the related art.

In the invention described in Japanese Patent Application Publication No. 2001-145946 (Patent Document 1), as illustrated in FIG. 6, sucking operation is started without securing the stable time interval, in order to shorten, as much as possible, the operation time of the vacuum generator before sucking. Thus, the sucking operation start pressure cannot be correctly detected, and it is difficult to avoid the effect of fluctuations in the operation of the ejector pins discussed earlier.

In the present embodiment, in a course during which the controller 7 causes the vacuum generator 33 to start sucking operation by opening the pressure valve 34 and causes the moving mechanism 5 to perform an operation to move the suction nozzle 31 closer to the molded product MP, the sucking operation start time determining section 75 of the controller 7 determines the sucking operation start time such that the stable time interval T3 is longer than the bias time interval Tb, whereby the stable time interval T3 is a time interval since the pressure detector 35 detects the predetermined pressure until a sucking operation start pressure is detected, whereby the sucking operation start pressure indicates that the suction nozzle 31 starts operation to suck up the molded product.

For example, the specific bias time interval Tb is determined to have a length corresponding to substantially four sampling periods of the pressure detector 35. More specifically, a time interval between 70 ms to 90 ms is preferably adopted as the bias time interval Tb.

As illustrated in FIG. 7, in order to reduce the amount of air to be consumed during suction, specifically, the sucking operation start time determining section 75 of the controller 7 automatically performs operation to bring the stable time interval T3 closer to the bias time interval Tb (operation to vary the sucking operation start time from 0 to t1 and then to t2) by decreasing the total time interval Ttr1+T3 by increasing a delay time interval Δti (time interval until sucking operation is started, whereby the time when the suction nozzle 31 passes a lowering start position P0 is defined as 0) in each take-out cycle.

However, it is necessary that this operation should be performed on condition that the stable time interval T3 is longer than the bias time interval Tb. When the sucking operation start time determining section 75 of the controller 7 determines the sucking operation start time such that the stable time interval T3 is longer than the bias time interval Tb, it is not necessary for an operator to determine the sucking operation start time (corresponding to the delay time interval Δti), which allows the pressure detector 35 to operate without trouble to prevent a suction error, by himself/herself by trial and error.

In addition, the controller 7 determines a sucking operation start time which allows the pressure detector 35 to operate without trouble to prevent the occurrence of a suction error, as an allowable sucking operation start time, or an allowable time for starting a sucking operation, even when the amount of air to be consumed by the vacuum sucker 3 is reduced by delaying the sucking operation start time (by increasing the delay time interval Δti before sucking operation is started). Therefore, with the present embodiment, it is possible to automatically reduce the amount of air to be consumed, and stably take out the molded product.

The degree of reduction in the amount of air to be consumed may be determined as necessary, as long as the stable time interval T3 is longer than the bias time interval Tb. The user may select to reduce the amount of air to be consumed to a half, one-third, one-fourth, etc. of the amount before being reduced.

When it is determined by the controller 7 that the sucking operation start time is not an allowable sucking operation start time, an alarm may be issued through display on a screen of a control unit (not illustrated) of the controller 7 or sound. In this case, the operator may change parameters related to the sucking operation start time via the control unit so as to advance the sucking operation start time.

Figure 8:
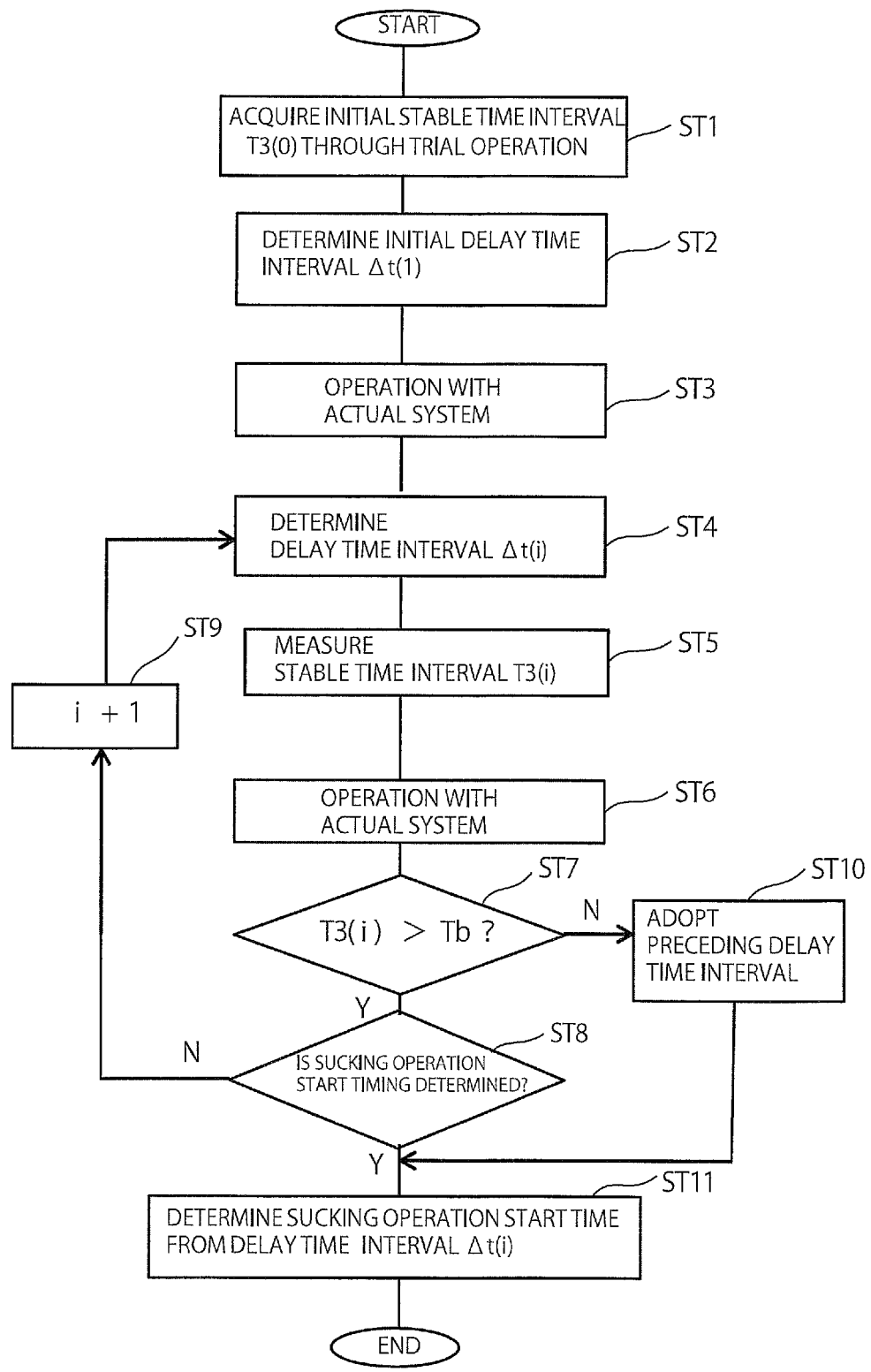
FIG. 8 is a flowchart of operation according to the embodiment.

An example of the sucking operation start time determining section 75 can implement the time chart illustrated in FIG. 7 according to the flowchart illustrated in FIG. 8, in order to determine the sucking operation start time. In step ST1, first, an initial stable time interval T3(0) is acquired through trial operation. To that end, in a first take-out cycle, the controller causes the vacuum generator 33 to start sucking operation by opening the pressure valve 34 at an original sucking start position P0 determined in advance and cause the moving mechanism 5 to perform an operation to move the suction nozzle 31 closer to the molded product, whereby a time when the suction nozzle 31 passes the original sucking start position P0 is defined as 0. During this course of operation, a time interval since a time when the pressure detector 35 detects the predetermined pressure until a time when the pressure detector 35 detects the sucking operation start pressure which indicates that the suction nozzle 31 has sucked up the molded product MP is acquired as an initial stable time interval T3(0) from the time interval measuring section 73. In addition, an initial delay time interval Δt(1) is determined [step ST2].

In second and subsequent take-out cycles for operation with the actual system for taking out a molded product, the vacuum generator 33 starts sucking operation by opening the pressure valve 34 when the time interval measuring section 73 measures a delay time interval Δt(i) from time 0 determined so as to become longer as the number of take-out cycles is increased in step ST4 on a basis of the initial stable time interval T3(0) and a number of take-out cycles.

In a course during which the moving mechanism 5 performs an operation to move the suction nozzle 31 closer to the molded product MP, the stable time interval T3 is acquired from the time interval measuring section 73, whereby the stable time interval T3 is the time since the time interval measuring section 73 measures the time interval Ttr1 until the pressure detector 35 detects the predetermined pressure, until the time that the sucking operation start pressure is detected [step ST5].

Any method may be used to increase the delay time interval Δt(i) each time the number of take-out cycles is increased. For example, the next delay time interval may be increased by a certain time interval determined in advance, or the amount of increase in the delay time interval Δt(i) may be increased in inverse proportion to the increase in the number of take-out cycles.

The second and subsequent take-out cycles are continued until the stable time interval T3 is brought to a value close to the bias time interval Tb [steps ST6 to ST9]. When the time that the stable time interval T3(i) is brought to the bias time interval Tb or brought close to the bias time interval Tb is determined in step ST8 for determining the sucking operation start time, the delay time interval Δti at that time is determined as the final allowable delay time interval Δti'.

The determination in step ST8 is executed with an allowable difference La determined in advance and on condition that [stable time interval T3(i)–bias time interval Tb La] is met, for example. In the subsequent operation with the actual system, operation is continued with the time when the final delay time interval ti' has elapsed since the time 0 which is defined as the sucking operation start time. When T3(i)>Tb is not met in step ST7, the process proceeds to step ST10, and the preceding delay time interval is adopted.

While an initial stable time interval T3(0) is determined in the first take-out cycle for trial operation in step ST1 in the flowchart in FIG. 8, a plurality of take-out cycles may be executed in trial operation and an initial stable time interval T3(0) may be determined from an analysis value based on a plurality of data obtained through the plurality of take-out cycles. In this case, step ST1 is configured as follows. In the first to n-th take-out cycles, the vacuum generator 33 starts sucking operation by opening the pressure valve 34 at an original sucking start position P0 determined in advance and the moving mechanism 5 performs an operation to move the suction nozzle 31 closer to the molded product, whereby a time when the suction nozzle 31 passes the original sucking start position is defined as 0. During this course of operation, the controller 7 acquires, as an initial stable time interval T3(n), from the time interval measuring section 73, a time interval since a time when the pressure detector 35 detects the predetermined pressure until a time when the pressure detector 35 detects the sucking operation start pressure which indicates that the suction nozzle 31 has sucked up the molded product. Then, an initial stable time interval T3(0) is determined using at least one or more statistic values of a minimum value, a maximum value, a median value, an average value, and a variance of the acquired n initial stable time intervals T3(n) as a data analysis value.

Figure 9:
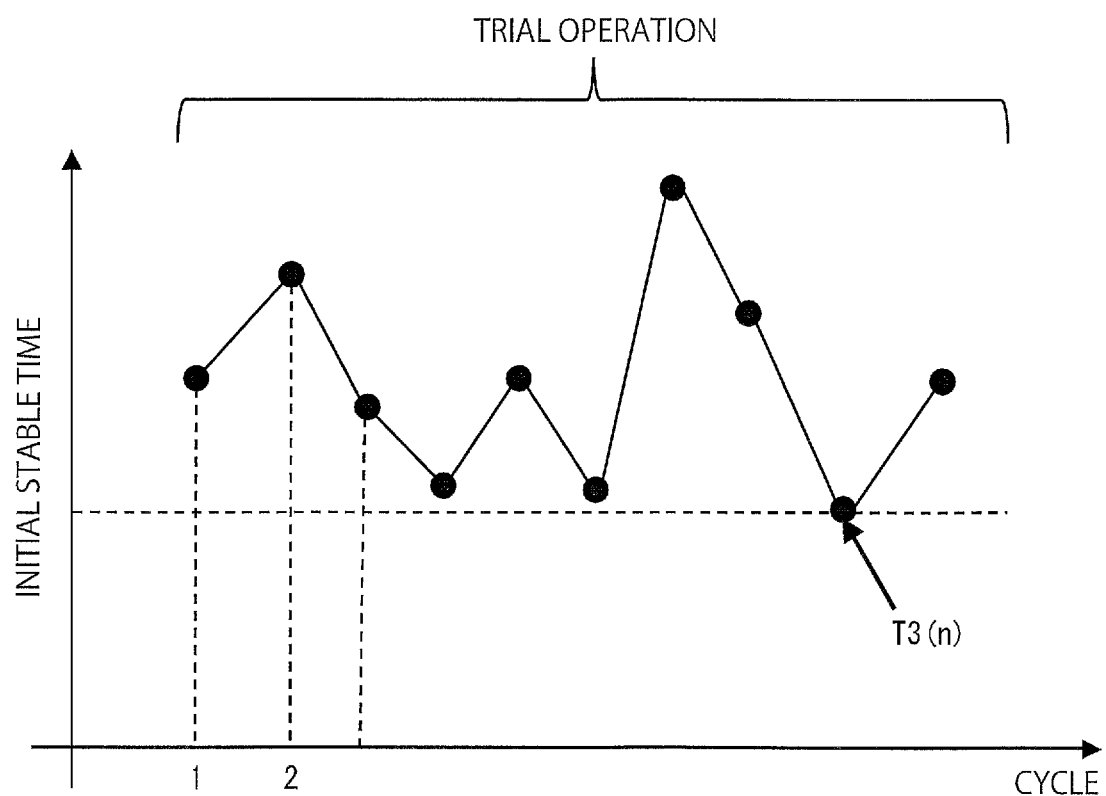
FIG. 9 illustrates example data on initial stable time intervals.

FIG. 9 illustrates an example in which an initial stable time interval T3(0) is determined using the minimum value of the initial stable time intervals T3(n) in trial operation. The subsequent operation is the same as the flowchart in FIG. 8 discussed earlier except that the second take-out cycle is replaced with the (n+1)-th take-out cycle. This enhances the precision in determining the initial stable time interval T3(0), and an appropriate sucking operation start time can be automatically determined even if the sucking operation start time is delayed stepwise.

INDUSTRIAL APPLICABILITY

According to the present invention, the controller determines the sucking operation start time such that the stable time interval is longer than the bias time interval. Thus, it is not necessary for an operator to determine the sucking operation start time (delay time), which allows the pressure detector to operate without trouble to prevent a suction error, by himself/herself by trial and error. According to the present invention, in addition, the controller determines a sucking operation start time, which allows the pressure detector to operate without trouble to prevent a suction error, even when the amount of air to be consumed by the vacuum sucker is reduced by delaying the sucking operation start time. Thus, the amount of air to be consumed can be reduced, and the molded product can be stably taken out.

What is claimed is:

1. A system for taking out a molded product, comprising:
a vacuum sucker including a suction member operable to suck up a molded product, a vacuum generator connected to the suction member via a pipe to apply a vacuum pressure to the suction member, a pressure valve provided in the pipe between the vacuum generator and the suction member to allow and block communication between the vacuum generator and the suction member, and a pressure detector operable to detect a pressure in the pipe between the pressure valve and the suction member;
a moving mechanism operable to move the suction member to transport the molded product to a release position after the molded product is pushed out of a mold of a molding machine by an ejector pin and sucked up by the suction member and then taken out; and
a controller configured to execute operation control for the vacuum generator and the pressure valve and movement control for the moving mechanism,
the controller being configured to start operation of the suction member to suck up the molded product after the pressure in the pipe reaches a predetermined pressure before the suction member sucks up the molded product, concurrently with the movement control for the moving mechanism, wherein:
the controller includes a time interval measuring section configured to measure a stable time interval since the pressure in the pipe reaches the predetermined pressure until a sucking operation start pressure is detected judging from an output from the pressure detector, the sucking operation start pressure indicating that the suction member starts operation to suck up the molded product with the predetermined pressure being maintained; and
the controller determines a sucking operation start time such that the stable time interval is longer than a bias time interval before the suction member sucks up the molded product, concurrently with the movement control for the moving mechanism, wherein
the controller includes
a stable time interval determining section configured to determine whether or not the stable time interval is longer than the bias time interval when the time interval measuring section measures the stable time interval in a course of the vacuum generator starting sucking operation by opening the pressure valve and the moving mechanism performing operation to move the suction member closer to the molded product, and
a sucking operation start time determining section configured to determine, as an allowable sucking operation start time, the sucking operation start time at a time when the stable time interval determining section determines that the stable time interval is longer than the bias time interval.

2. The system for taking out a molded product according to claim 1, wherein
the bias time interval is set to be equal to or more than a time interval that is necessary to detect judging from the output from the pressure detector that the pressure in the pipe has reached the predetermined pressure.

3. A system for taking out a molded product, comprising:
a vacuum sucker including a suction member operable to suck up a molded product, a vacuum generator connected to the suction member via a pipe to apply a vacuum pressure to the suction member, a pressure valve provided in the pipe between the vacuum generator and the suction member to allow and block communication between the vacuum generator and the suction member, and a pressure detector operable to detect a pressure in the pipe between the pressure valve and the suction member;

a moving mechanism operable to move the suction member to transport the molded product to a release position after the molded product is pushed out of a mold of a molding machine by an ejector pin and sucked up by the suction member and then taken out; and a controller configured to execute operation control for the vacuum generator and the pressure valve and movement control for the moving mechanism, the controller being configured to start operation of the suction member to suck up the molded product after the pressure in the pipe reaches a predetermined pressure before the suction member sucks up the molded product, concurrently with the movement control for the moving mechanism, wherein:

the controller includes a time interval measuring section configured to measure a stable time interval since the pressure in the pipe reaches the predetermined pressure until a sucking operation start pressure is detected judging from an output from the pressure detector, the sucking operation start pressure indicating that the suction member starts operation to suck up the molded product with the predetermined pressure being maintained; and the controller determines a sucking operation start time such that the stable time interval is longer than a bias time interval before the suction member sucks up the molded product, concurrently with the movement control for the moving mechanism, wherein:

the controller is configured to:
  acquire, in a first take-out cycle, a time interval since a time when the pressure detector detects the predetermined pressure until a time when the pressure detector detects the sucking operation start pressure which indicates that the suction member has sucked up the molded product as an initial stable time interval from the time interval measuring section, in a course of the vacuum generator starting sucking operation by opening the pressure valve at an original sucking start position determined in advance and the moving mechanism performing operation to move the suction member closer to the molded product with a time when the suction member passes the original sucking start position being defined as 0,
  acquire, in second and subsequent take-out cycles, the stable time interval since the pressure detector detects the predetermined pressure until the pressure detector detects the sucking operation start pressure from the time interval measuring section in a course of the vacuum generator starting sucking operation by opening the pressure valve and the moving mechanism performing operation to move the suction member closer to the molded product when the time interval measuring section measures a delay time interval from time 0 determined on a basis of the initial stable time interval and a number of take-out cycles so as to become longer as the number of take-out cycles is increased,
  continue the second and subsequent take-out cycles while changing the delay time interval stepwise, and determine the delay time interval which renders the stable time interval longer than the bias time interval as an allowable delay time interval, and
  thereafter determine a time when the allowable delay time interval has elapsed since the time 0 as the allowable sucking operation start time.

4. A system for taking out a molded product, comprising:
a vacuum sucker including a suction member operable to suck up a molded product, a vacuum generator connected to the suction member via a pipe to apply a vacuum pressure to the suction member, a pressure valve provided in the pipe between the vacuum generator and the suction member to allow and block communication between the vacuum generator and the suction member, and a pressure detector operable to detect a pressure in the pipe between the pressure valve and the suction member;

a moving mechanism operable to move the suction member to transport the molded product to a release position after the molded product is pushed out of a mold of a molding machine by an ejector pin and sucked up by the suction member and then taken out; and a controller configured to execute operation control for the vacuum generator and the pressure valve and movement control for the moving mechanism, the controller being configured to start operation of the suction member to suck up the molded product after the pressure in the pipe reaches a predetermined pressure before the suction member sucks up the molded product, concurrently with the movement control for the moving mechanism, wherein:

the controller includes a time interval measuring section configured to measure a stable time interval since the pressure in the pipe reaches the predetermined pressure until a sucking operation start pressure is detected judging from an output from the pressure detector, the sucking operation start pressure indicating that the suction member starts operation to suck up the molded product with the predetermined pressure being maintained; and the controller determines a sucking operation start time such that the stable time interval is longer than a bias time interval before the suction member sucks up the molded product, concurrently with the movement control for the moving mechanism, wherein the controller is configured to:
  acquire, in first to n-th take-out cycles where n is an integer of two or more, a time interval since a time when the pressure detector detects the predetermined pressure until a time when the pressure detector detects the sucking operation start pressure which indicates that the suction member has started operation to suck up the molded product as an initial stable time interval from the time interval measuring section, in a course of the vacuum generator starting sucking operation by opening the pressure valve at an original sucking start position determined in advance and the moving mechanism performing operation to move the suction member closer to the molded product with a time when the suction member passes the original sucking start position being defined as 0, and determine a data analysis value for n initial stable time intervals as an initial stable time interval to be used thereafter,
  acquire, in (n+1)-th and subsequent take-out cycles, the stable time interval since the pressure detector detects the predetermined pressure until the pressure detector detects the sucking operation start pressure from the time interval measuring section in a course of the vacuum generator starting sucking operation by opening the pressure valve and the moving mechanism performing operation to move the suction member closer to the molded product when the time interval measuring section measures a delay time interval from time 0 determined on a basis of the initial stable time interval and a number of take-out cycles so as to become longer as the number of take-out cycles is increased, continue the (n+1)-th and subsequent take-out cycles while changing the delay time interval stepwise, and determine the delay time interval which renders the stable time interval longer than the bias time interval as an allowable delay time interval, and thereafter determine a time when the allowable delay time interval has elapsed since the time 0 as the allowable sucking operation start time.

5. The system for taking out a molded product according to claim 4, wherein the data analysis value is one or more statistic values of a minimum value, a maximum value, a median value, an average value, and a variance.

6. The system for taking out a molded product according to claim 4, wherein the bias time interval is set to be equal to or more than a time interval that is necessary to detect judging from the output from the pressure detector that the pressure in the pipe has reached the predetermined pressure.

* * * * *